United States Patent [19]

Yardy

[11] 4,271,334

[45] Jun. 2, 1981

[54] APPARATUS FOR CORRECTING FOR TEMPERATURE-INDUCED TRACKING ERRORS IN A SYSTEM FOR RECOVERING INFORMATION FROM A RECORDING DISC

[75] Inventor: Raymond Yardy, Rancho Palos Verdes, Calif.

[73] Assignee: Discovision Associates, Costa Mesa, Calif.

[21] Appl. No.: 27,794

[22] Filed: Apr. 6, 1979

[51] Int. Cl.³ .............................................. G11B 7/00
[52] U.S. Cl. .................................... 369/41; 369/33; 346/76 L; 346/108; 369/44
[58] Field of Search ............. 358/128.5; 179/100.3 V, 179/100.3 B, 100.3 G, 100.1 G; 365/215, 216, 234; 360/77; 346/76 L, 108

[56] References Cited

U.S. PATENT DOCUMENTS

| | | | |
|---|---|---|---|
| 3,657,707 | 4/1972 | McFarland et al. | 365/127 |
| 3,789,378 | 1/1974 | Bonzano et al. | 360/77 |
| 3,894,276 | 7/1975 | Janssen | 179/100.1 G |
| 3,909,608 | 9/1975 | Le Merer et al. | 179/100.3 G |
| 4,074,085 | 2/1978 | Russell | 179/100.3 B |
| 4,106,058 | 8/1978 | Romeas et al. | 358/128.5 |
| 4,118,735 | 10/1978 | Wilkinson | 358/128.5 |
| 4,135,217 | 1/1979 | Jacques et al. | 360/77 |
| 4,138,741 | 2/1979 | Hedlund et al. | 365/234 |
| 4,142,209 | 2/1979 | Hedlund et al. | 358/128.5 |

OTHER PUBLICATIONS

Broadbent, "A Review of the MCA Disco-Vision System", Journal of the SMPTE, Jul. 1974, vol. 83, pp. 554-559.

Primary Examiner—John H. Wolff
Assistant Examiner—Donald McElheny, Jr.
Attorney, Agent, or Firm—Ronald J. Clark

[57] ABSTRACT

A servo control apparatus for maintaining a scanning device, such as a beam of radiation, aligned with an information recording track on a moving recording medium, such as a record disc. The apparatus is especially adapted for use in correcting for tracking deviations brought about by temperature-induced expansion and contraction of the disc, which causes the recording track being scanned to move radially outwardly or inwardly relative to the beam of radiation. In the preferred embodiment, the apparatus includes a movable mirror for oscillating the beam in a radial direction, in accordance with a periodic dither signal. This causes a corresponding variation in the intensity of the beam reflected by the disc, with the amplitude and phase angle of this intensity variation, relative to that of the dither signal, indicating the direction and magnitude of the deviation of the beam from the track centerline. Whenever the magnitude exceeds a prescribed level, a step forward or step reverse pulse signal is coupled to a stepper motor, to increment the beam in the appropriate radial direction, whereby the beam is maintained substantially aligned with the centerline of the recording track.

12 Claims, 6 Drawing Figures

APPARATUS FOR CORRECTING FOR TEMPERATURE-INDUCED TRACKING ERRORS IN A SYSTEM FOR RECOVERING INFORMATION FROM A RECORDING DISC

BACKGROUND OF THE INVENTION

The present invention relates generally to systems for recording and/or reading information on an information recording medium and, more particularly, to apparatus for maintaining a beam of radiation in alignment with an information recording track on such a medium.

Apparatus of this particular type are of special use in direct-read-after-write record disc systems, wherein both a write beam of radiation and a read beam of radiation are utilized to scan the disc. The write beam is modulated in intensity by an information signal to be recorded, so that as the disc is rotated relative to the beam, a succession of microscopic holes or pits is formed, representative of the information signal and arranged in a substantial circular recording track. Typically, after each track is recorded, the radial position of the write beam is incremented by means of a radially movable carriage, whereby a succession of concentrically arranged tracks is formed. The read beam of radiation is utilized to scan the successive pits immediately after they are formed, producing a reflected beam of radiation that is modulated by the recorded information. This reflected beam can be used to verify that the information signal was properly recorded.

Frequently, it is desirable to wait for a period of time between the writing of successive information tracks on the disc. During this time, the write beam is disabled, but variations in the environmental temperature of the system can cause the disc to expand or contract relative to the carriage, such that the radial position of the write beam, if it were again enabled, will have changed with respect to the location of the last-written information track. This is especially the case where very thin plastic recording discs are utilized. To minimize the time required to properly position the radially movable carriage such that the next information track is recorded in the proper radial position on the disc, then, it is desirable to maintain the carriage continuously in a prescribed relationship relative to the tracks on the disc, regardless of variations in environmental temperature.

One technique for accomplishing this is to monitor the temperature of the disc, and then estimate the actual radius of the next track to be recorded and maintain the carriage properly positioned with respect to that estimated radius. This technique is not entirely satisfactory, however, because the temperature is not ordinarily uniform throughout the system and throughout the disc. Thus, such a technique cannot ordinarily provide sufficient positioning precision to permit high information recording densities.

Another technique for compensating for temperature-induced variations in the radii of information tracks on a recording disc is to mount the radially movable carriage on a special mounting that closely matches the physical characteristics of the disc. Thus, environmental temperature variations will affect the disc and the carriage mounting by corresponding amounts, and the carriage will be automatically maintained in a prescribed relationship relative to the tracks on the disc. This technique is not entirely satisfactory, either, however, because it is not ordinarily possible to insure that environmental temperature variations will affect both the carriage mounting and the disc equally. As a result, information recording densities that can be achieved are unduly limited.

It will thus be appreciated from the foregoing that there is a need for an effective apparatus for maintaining a radially movable carriage in a prescribed relationship relative to information tracks on a storage disc, regardless of temperature variations that cause the disc to expand or contract relative to the carriage. The present invention fulfills this need.

SUMMARY OF THE INVENTION

Basically, the present invention is embodied in a tracking apparatus for maintaining scanning means, such as a beam of radiation, in a prescribed position relative to an information track on a recording medium. The apparatus includes carriage means, which directs the beam at the medium, and which is movable in a direction generally transverse to the axis of the information track, and includes means for detecting the position of the beam of radiation relative to the information track. In accordance with the invention, the detecting means operates to produce a control pulse signal in accordance with the detected position of the beam of radiation, and the apparatus further includes stepping motor means, responsive to the control pulse signal, for moving the carriage in the transverse direction, whereby the beam is maintained in a prescribed relationship relative to the track.

More particularly, the tracking apparatus of the present invention is especially adapted for use in a direct-read-after-write recording system, wherein a write beam and a read beam are focused onto a rotatable information recording disc via an objective lens mounted on the movable carriage means. The system operates to record a succession of substantially circular and concentrically arranged information tracks on the disc. After the system has recorded a particular information track, and while it is waiting to record the next successive track, the write beam is disabled, but the read beam continues to scan the disc. At this time, the tracking apparatus of the present invention operates to maintain the read beam aligned with the last-recorded track, thus automatically correcting for temperature variations that cause the disc to expand or contract relative to the carriage means. Then, when it is time for the next successive track to be recorded on the disc, the carriage means need be incremented only one track spacing before the write beam is again enabled and focused onto the disc.

The stepper motor means operates to move the carriage means radially outwardly or inwardly, to match the expansion and/or contraction of the disc resulting from temperature variations therein. Each track spacing preferably corresponds to a plurality of steps in the motor means, whereby the apparatus can have sufficient resolution capability to maintain the read beam aligned very closely with the centerline of the last-recorded track.

The detecting means can comprise a dither tracking system, wherein a periodic dither signal and an associated mirror are utilized to oscillate the read beam in a direction generally perpendicular to the axis of the recording track being scanned. This oscillation causes a corresponding variation in the average radiation intensity of the reflected beam. The phase angle of the resultant radiation intensity variations relative to that of the dither signal, and the amplitude of the intensity variations, indicate the direction and magnitude of the deviation of the read beam from the centerline of the track being scanned.

In accordance with another aspect of the present invention, whenever the detected deviation of the read beam from the track centerline exceeds a predetermined amount, a step forward or step reverse pulse signal is coupled to the stepper motor means, to move the carriage radially outwardly or inwardly and thus correct for the deviation. The dither tracking system can further include a low pass filter, such that only very low frequency variations in the average radiation intensity of the reflected beam, particularly those caused by temperature changes in the disc material, are corrected for.

Other aspects and advantages of the present invention will become apparent from the following description of the preferred embodiment, taken in conjunction with the accompanying drawings, which disclose, by way of example, the principles of the invention.

DESCRIPTION OF THE PREFERRED EMBODIMENT

Figure 1:
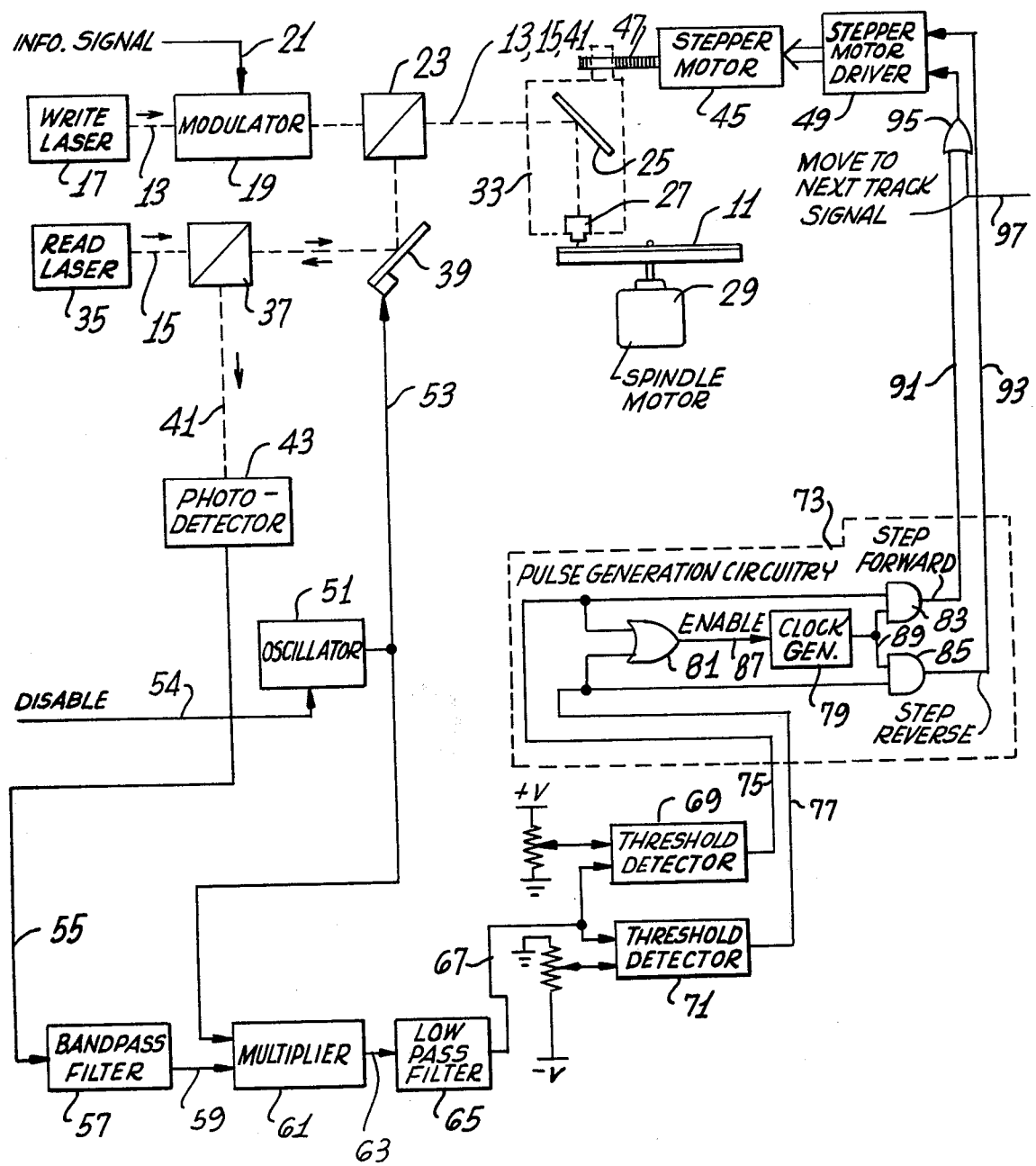
FIG. 1 is a simplified block diagram of a tracking apparatus in accordance with the present invention, for maintaining a read beam of radiation in alignment with the centerline of an information track on a recording disc.

Referring now to the drawings, and particularly to FIG. 1, there is shown a tracking servo apparatus for maintaining a beam of radiation in alignment with the centerline of an information recording track on a rotatable recording disc 11. The apparatus is shown in use in a direct-read-after-write system that utilizes a write beam of radiation 13 to record information in a plurality of substantially circular and concentrically arranged information tracks on the disc, and a read beam of radiation 15 to read the information immediately after it has been recorded.

The write beam of radiation 13 is produced by a write laser 17 and is initially transmitted to a modulator 19, which modulates the intensity of the beam in accordance with an information signal supplied over line 21. The modulated write beam is then transmitted through a first beam splitter 23, reflected by a mirror 25, and, in turn, focused onto the disc 11 by an objective lens 27. The disc is rotated at a prescribed angular velocity by a spindle motor 29, and the intensity of the modulated write beam is alternately above and below a threshold at which melting or evaporation of the disc material occurs, so a sequence of spaced holes or pits 31 (FIG. 2a), representative of the information signal, is formed in the disc. The mirror 25 and the objective lens 27 are both mounted on a carriage 33 that is moved in a radial direction approximately 2 microns after each information track has been recorded, whereby a succession of closely-spaced, concentrically arranged information tracks is formed.

The read beam of radiation 15 is produced by a read laser 35 and has a substantially uniform intensity. It is initially transmitted through a second beam splitter 37, after which it is reflected by a bimorph mirror 39 to the first beam splitter 23, where it is reflected and combined with the intensity-modulated write beam of radiation 13. The read beam is then directed to the disc 11 by the carriage-mounted mirror 25 and objective lens 27. The read beam and write beam are aligned with respect to each other such that they impinge on the disc at a common radius, with the write beam leading the read beam by approximately 50 microns.

The information-bearing pits 31 formed by the write beam of radiation 13 are substantially non-reflective of the uniform-intensity read beam of radiation 15, whereas portions of the disc not occupied by such a pit are highly reflective of the read beam. Thus, a reflected beam of radiation 41 modulated in intensity by the recorded information, is produced. This reflected beam is collected by the objective lens 27 and transmitted along the same path as the read beam back to the second beam splitter 37, where it is reflected and transmitted to a photodetector 43, which produces an electrical signal proportional to the intensity of the beam. A data subsystem (not shown) in the direct-read-after-write system compares this intensity signal to a delayed version of the information signal previously supplied on line 21 to the write beam modulator 21, to verify that the information was properly recorded on the disc 11.

After an information track has been recorded on the disc 11, there is frequently an extended time delay before the information signal is received for the next track to be recorded. During this time, the write beam of radiation 13 is disabled so that no pits will be formed in the disc. Nevertheless, it is desirable to maintain the radially movable carriage 33 aligned with respect to tracks on the disc, whereby, when the information signal is again received, the carriage will be properly positioned to direct the write beam onto the appropriate disc radius, without any undue delays.

During the time period between the recording of successive information tracks, however, variations in the environmental temperature of the recording system can cause substantial expansion or contraction of the disc 11 relative to the carriage 33. This is especially the case where relatively thin plastic discs are used, since they will respond much more quickly to environmental temperature variations than the relatively more massive carriage. Thus, if no temperature compensation is made, and the carriage is simply incremented radially by one track spacing, the next-recorded information track could actually be superimposed directly upon a previously-recorded track. Thus, a tracking system is needed to ensure that the successive information recording tracks will be substantially equally spaced with respect to each other, regardless of temperature-induced expansion or contraction of the disc that can occur during the time between the writing of the successive tracks.

In the tracking servo apparatus of FIG. 1, the read beam of radiation 15 is utilized to continuously scan the disc 11, even during the time periods when the write beam of radiation 13 is disabled. During such times, when the write beam is disabled, the tracking servo apparatus operates to sense any radial deviation of the read beam from the centerline of the last-recorded information track. In accordance with the invention, a step forward and a step reverse signal are produced by the apparatus whenever it is determined that the read beam has deviated from the track centerline by more than a prescribed amount, and the apparatus further includes a stepper motor 45, responsive to the two step signals, for moving the carriage 33 radially and thereby maintaining the read beam in substantial alignment with the track centerline. Thus, the tracking apparatus operates to track the previously-recorded information track, regardless of any temperature variations that cause expansion or contraction of the disc.

In the preferred embodiment, the stepper motor 45 is coupled to a lead screw 47 that engages the radially movable carriage 33. Each discrete step of the motor preferably corresponds to one track spacing on the disc 11. Additionally, the apparatus utilizes a special stepper motor driver 49 that receives the step forward and step reverse pulse signals and, accordingly, controls the electrical currents supplied to the successive windings of the stepper motor, to accurately position the lead screw at a plurality of angular locations intermediate the discrete steps of the stepper motor. One suitable driver device is a Model No. SSD-4-20 stepper motor driver, produced by Mesur-Matic Electronics Corporation of Salem, Mass. In the preferred embodiment, the stepper motor driver 49 and the stepper motor 45, in combination, require ten pulses to be received in order to increment the carriage 33 a distance of one track spacing.

Figure 2A:
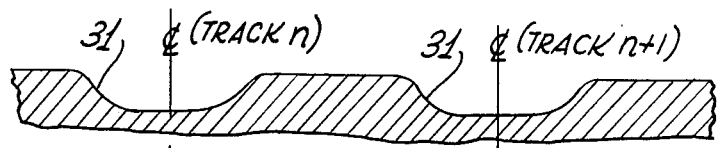
FIG. 2a is a fragmentary cross-sectional view of the surface of the recording disc of FIG. 1, taken along a radial line through the center of the disc.

In the preferred embodiment, the tracking servo apparatus utilizes a dither system that is similar in many respects to that described in U.S. Pat. No. 4,118,735, issued Oct. 3, 1978 in the name of Richard L. Wilkinson and entitled "Synchronous Detection Tracking of Video Disc". The dither system operates to center the read beam 15 on a recording track by making use of the fact that the average intensity of the reflected beam 41 varies according to the deviation the read beam from the track centerline. This is depicted in FIGS. 2a and 2b, wherein FIG. 2a is a cross-section view of the disc 11, taken along a radial line through the center of the disc, with a pit 31 in each of tracks n and n+1 being intersected, and wherein FIG. 2b is a graph showing the corresponding reflectivity of the disc as a function of radius.

Figure 2B:
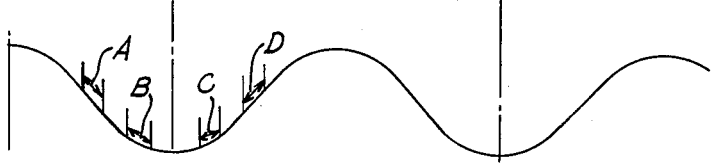
FIG. 2b is a graph showing the average intensity of a beam of radiation reflected by the disc of FIG. 2a, such intensity varying as a function of disc radius.

As shown in FIG. 2b, the average intensity of the reflected beam 41 is lowest when the read beam 15 is in precise alignment with an information track, since the beam then will impinge directly on a non-reflective pit 31 for a substantial proportion of the time. The average intensity is highest, on the other hand, when the read beam is centered midway between two tracks. It will be appreciated that this average intensity graph is approximately sinusoidal because the width of the point of impingement of the read beam with the disc 11 is comparable in size to the width of the various pits. Additionally, it will be appreciated that, when the read beam is properly aligned with a recording track, the reflected beam will actually comprise a high-frequency carrier signal, because of the pits being scanned. As will later be explained, however, the high-frequency component is filtered out, and only the average beam intensity need be considered in describing the invention.

Figure 3:
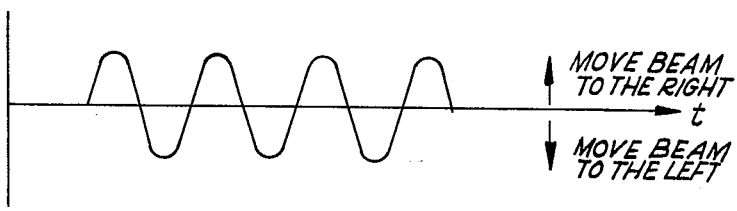
FIG. 3 is a graph of a constant-frequency, constant-amplitude radial dither signal utilized in the apparatus of FIG. 1.

The apparatus includes an oscillator 51 for producing a constant amplitude, constant frequency radial dither signal, depicted in FIG. 3, that is supplied over line 53 to the bimorph mirror 39. The oscillator is disabled by a disable signal transmitted over line 54 from a control subsystem (not shown) whenever information is being recorded on the disc 11. The frequency of the dither signal produced by the oscillator is preferably about 250 Hz. This oscillates the mirror and thus causes the point of impingement of the read beam 15 on the disc 11 to oscillate in a direction transverse to the axes of the information tracks, the peak-to-peak magnitude of the oscillation preferably being approximately 20 to 30 percent of a track spacing. The point of impingement moves to the right when the signal is positive, and to the left when the signal is negative.

The oscillation of the read beam 15 relative to the information track being scanned causes a corresponding oscillation in the average intensity of the reflected beam of radiation 41. The amplitude of this radiation intensity variation, and its phase angle relative to that of the periodic dither signal, indicate the magnitude and direction of any deviation of the read beam from the centerline of the information track being scanned.

Figure 4:
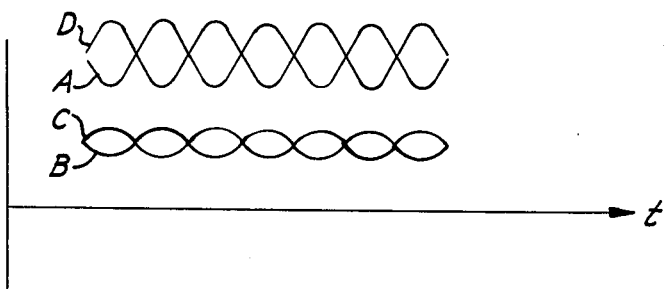
FIG. 4 is a graph of the reflected beam intensity signals for four different positions of the read beam relative to the track centerline, showing the effect of the radial dither signal.

FIG. 4 shows the effect the radial dither signal has on the average reflectivity of the reflected beam of radiation 41, for four different read beam locations, designated A, B, C and D, relative to the centerline of a recording track. As shown in FIG. 2b, location A corresponds to a relatively large deviation to the left of the centerline, location B a relatively small deviation to the left, location C a relatively small deviation to the right, and location D a relatively large deviation to the right It will be noted in FIG. 4 that when the read beam 15 has deviated to the left of a track centerline (i.e., locations A and B), the average reflectivity signal is 180° out of phase with the radial dither signal (FIG. 3), whereas, when the read beam has deviated to the right (i.e., locations C and D), the reflectivity signal is in phase with the dither signal. Also, it will be noted that the amplitude of the light intensity variations is larger when the beam has deviated a substantial distance (i.e., locations A and D) from the centerline than when it has deviated only slightly (i.e., locations B and C).

Referring again to FIG. 1, it will be noted that the reflected light intensity signal produced by the photodetector 43 is supplied over line 55 to a bandpass filter 57, which has a center frequency corresponding to the frequency of the radial dither signal, i.e., about 250 Hz, and which operates to extract from the intensity signal the effect of the dithering.

The output signal of the bandpass filter 57 is supplied over line 59 to a multiplier circuit 61, where it is multiplied with the radial dither signal, supplied on line 53 from the oscillator 51. This produces an intermediate signal whose polarity is indicative of the direction of deviation of the read beam of radiation 15 with respect to a track centerline, and whose amplitude is indicative of the amount of such deviation.

Figure 5:
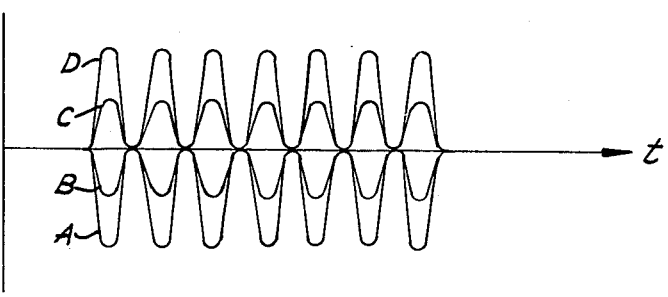
FIG. 5 is a graph of the intermediate signals obtained by multiplying the four intensity signals of FIG. 4 by the radial dither signal of FIG. 3.

FIG. 5 shows the intermediate signal produced by the multiplier circuit 61 for the four locations (A, B, C and D) of the read beam 15 relative to a track centerline. It will be noted that the signal has a frequency double that of the radial dither signal (FIG. 3), and that the d.c. level of the signal is positive when the beam has deviated to the right of the centerline (locations C and D)

and negative when the beam has deviated to the left of the centerline (locations A and B). Also, it will be noted that the average magnitude of the signal, either positive or negative, is greater for large deviations of the read beam (locations A and D) than for small deviations (locations B and C).

The intermediate signal produced by the multiplier 61 is supplied over line 63 to a low pass filter 65, which removes from the signal the oscillations caused by the dither signal, leaving only relatively low-frequency variations, particularly those caused by temperature-induced expansion or contraction of the disc 11. The bandwidth of the low pass filter is preferably about 2 Hz. The filter output is positive when the read beam 15 has deviated to the right of a track centerline, and negative when it has deviated to the left, and the magnitude of the output is generally higher for larger deviations.

The output signal produced by the low pass filter 65 is coupled over line 67 to positive and negative threshold detectors, 69 and 71, respectively, which compare the amplitude of the signal to prescribed positive and negative thresholds. When the signal exceeds the positive threshold, the output of the positive threshold detector 69 changes state to a logical "one", indicating that the read beam of radiation 15 has deviated to the right of a track centerline by more than a prescribed amount. Similarly, when the signal exceeds the negative threshold, the output of the negative threshold detector 71 changes state to a logical "one" indicating that the beam has deviated to the left of a track centerline by more than a prescribed amount. The magnitudes of the positive and negative thresholds preferably correspond to a deviation of about 10 to 15 percent of a track spacing.

The tracking apparatus of the present invention further includes pulse generation circuitry 73, which receives the outputs of the respective threshold detectors 69 and 71 on lines 75 and 77, respectively, and outputs either step forward or step reverses pulses, as appropriate, for coupling to the stepper motor 45 to step the read beam 15 in the direction of the track centerline. The circuitry 73 includes a clock generator 79, an OR gate 81 and two AND gates 83 and 85. The outputs of the two threshold detectors are connected to the input terminals of the OR gate, where they are "OR'ed" and, in turn, coupled over line 87 to an ENABLE terminal on the clock generator. When enabled, the clock generator immediately outputs a pulse on line 89, and continues to output pulses on that line, at a frequency of about 2 Hz, so long as it remains enabled. The output of the clock generator is coupled over line 89 to one input terminal on each of the two AND gates 83 and 85, and connected to the other input terminal on each AND gate is one of the respective threshold detector outputs. The AND gate 83 outputs the step forward pulse signal, and the AND gate 85 outputs the step reverse pulse signal, for coupling over lines 91 and 93, respectively, to the stepper motor driver 49. Each step pulse signal comprises a 2 Hz pulse sequence that continues for as long as the corresponding threshold is exceeded by the output signal from the low pass filter 65.

To facilitate the incrementing of the read beam of radiation 15 from one track radius to the next, as, for example, when the next track is to be recorded, the apparatus further includes an OR gate 95 for "OR'ing" the step forward pulses supplied on line 91 with a "move-to-next-track" signal, supplied on line 97 from a control subsystem (not shown). This move-to-next-track signal comprises a burst of about ten pulses, whereby the carriage 33 is moved radially by an amount that corresponds to one track spacing.

In an alternative embodiment of the present invention (not shown), two stepper motors, coupled together in a special series arrangement, are substituted for the stepper motor 45 and the stepper motor driver 49 of FIG. 1. In this special arrangement, the rotor or output shaft of the first motor is coupled to the stator or field structure of the second motor, whereby the output shaft of the second motor can be positioned at a selected angle intermediate its own steps. A more detailed description of this special arrangement is provided in U.S. Pat. No. 4,065,685, issued in the name of H. R. Newell and entitled "Interpolating Step Motor System With Reduction Drive Interface".

It will be appreciated from the foregoing that the present invention represents a significant advance in the field of tracking systems, especially as applied in direct-read-after-write disc recording systems. In particular, the invention provides an effective apparatus for maintaining a beam of radiation in alignment with a selected information track on the disc, regardless of relative expansion or contraction of the disc due to environmental temperature variations.

Although the invention has been described in detail with reference to its presently preferred embodiment, it will be understood by one of ordinary skill in the art that various modifications can be made without departing from the spirit and scope of the invention. Accordingly, it is not intended that the invention be limited, except as by the appended claims.

I claim:

1. Tracking apparatus for aligning a beam of radiation with respect to a selected one of a plurality of substantially circular and concentrically arranged information tracks on a rotatable information recording disc, said beam of radiation being reflected in a prescribed manner by the recording disc, to produce a reflected beam of radiation having an average intensity that varies according to the deviation of the beam of radiation from the centerline of the selected information track, said tracking apparatus comprising:

carriage means for directing the beam of radiation at the disc as the disc is rotated with respect thereto, said carriage means being controllably movable along a generally radial axis relative to the disc;

photodetector means for detecting the reflected beam of radiation and producing an information signal that corresponds to the intensity thereof;

oscillator means for producing a periodic dither signal;

means, responsive to the dither signal, for causing the beam of radiation to oscillate along an axis transverse to the axis of the selected information track, thereby causing a corresponding oscillation in the average intensity of the reflected beam of radiation and in the average magnitude of the information signal;

beam deviation sensing means for comparing the oscillation in the average magnitude of the information signal to the periodic dither signal, thereby producing an intermediate signal, said intermediate signal being indicative of both the magnitude and direction of any deviation of the beam of radiation from the centerline of the selected information track;

means for low pass filtering the intermediate signal to remove signal variations having a frequency comparable to the angular velocity of the recording disc;

control pulse signal means, responsive to the low pass filtered intermediate signal, for producing a corresponding control pulse signal; and stepper motor means, responsive to the control pulse signal, for moving said carriage means along the generally radial axis, a prescribed plurality of steps of said stepper motor means corresponding to the spacing between adjacent information tracks, whereby the beam of radiation is positioned in substantial alignment with the centerline of the selected information track.

2. Tracking apparatus as defined in claim 1, wherein said control pulse signal means ncludes threshold detector means, responsive to the low pass filtered intermediate signal, for detecting when the beam of radiation has deviated from the centerline of the selected information track by more than a prescribed threshold, said control pulse signal means producing the control pulse signal only when the threshold is exceeded, said control pulse signàl being a sequence of pulses having a prescribed, constant frequency.

3. Tracking apparatus for use in a direct-read-after-write recording system of the type having a write beam of radiation and a read beam of radiation that are directed at a rotatable information recording disc by a radially movable carriage means, the intensity of the write beam being selectively controlled to record a sequence of circular and concentric information tracks on the recording disc, as the disc is rotated at a prescribed angular velocity, said tracking apparatus operating when the write beam is selectively disabled to align the read beam with a selected one of the information tracks, said apparatus comprising:

means for detecting any deviation of the read beam of radiation from the centerline of the selected information track and for producing a corresponding intermediate signal;

means for low pass filtering the intermediate signal, to remove any signal components having a frequency the same as or greater than the angular velocity of the recording disc; and means, responsive to the filtered intermediate signal, for controllably moving said carriage means in a radial direction to position the read beam of radiation in substantial alignment with the selected information track, thereby compensating for temperature-induced expansion and contraction of the recording disc.

4. Tracking apparatus as defined in claim 3, wherein:

the read beam of radiation is reflected by the recording disc to produce a reflected beam having an intensity modulated by the recorded information and having an average intensity that varies in accordance with the deviation of the read beam from the centerline of the selected information track; and the means for detecting includes photodetector means for detecting the reflected beam and producing an information signal corresponding to the intensity thereof, and means, responsive to variations in the average magnitude of the information signal, for producing the intermediate signal.

5. Tracking apparatus as defined in claim 4, wherein said detecting means further includes:

oscillator means for producing a periodic dither signal;

means, responsive to the dither signal, for causing the read beam to oscillate along an axis transverse to the axis of the selected information track, thereby causing a corresponding oscillation in the average intensity of the reflected read beam and in the average magnitude of the information signal; and means for comparing the oscillation in the average magnitude of the information signal to the periodic dither signal, to produce the intermediate signal, wherein the intermediate signal is indicative of both the magnitude and direction of any deviation of the read beam from the centerline of the selected information track.

6. Tracking apparatus as defined in claim 5, wherein the means for causing the read beam to oscillate includes a bimorph mirror disposed in the path of the read beam.

7. Tracking apparatus as defined in claim 3, wherein said means for controllably moving includes:

means, responsive to the filtered intermediate signal, for producing a control pulse signal containing a sequence of pulses whenever the intermediate signal exceeds a prescribed threshold; and stepper motor means, responsive to the control pulse signal, for moving said carriage means, said stepper motor means being coupled to said carriage means such that a prescribed plurality of pulses of the control pulse signal are required to translate the read beam from one information track to an adjacent information track.

8. Apparatus for recording and playing back information on a rotatable information recording disc, comprising:

means for producing a write beam of radiation and a read beam of radiation, the write beam having an intensity modulated by the information to be recorded;

optical path means for directing the intensity-modulated write beam and the read beam to impinge at prescribed locations on the disc, as the disc is rotated at a prescribed angular velocity, the optical path means including carriage means that are radially movable with respect to the disc such that the write beam records a sequence of circular and concentric information tracks in the disc, the optical path means including only optical elements that are immovable at frequencies the same as or greater than the angular velocity of the disc;

means for selectively disabling the write beam; and tracking means, operable whenever the write beam is disabled, for aligning the read beam with a selected one of the information tracks, the tracking means including means for detecting any deviation of the read beam from the centerline of the selected track, and for producing a corresponding intermediate signal, means for low pass filtering the intermediate signal, to remove any signal components having a frequency the same as or greater than the angular velocity of the disc, and means, responsive to the filtered intermediate signal, for controllably moving the carriage means in a radial direction, to position the read beam in substantial alignment with the selected track, thereby compensating for temperature-induced expansion and contraction of the disc.

9. Apparatus as defined in claim 8, wherein:

the read beam of radiation is reflected by the recording disc to produce a reflected beam having an intensity modulated by the recorded information and having an average intensity that varies in accordance with the deviation of the read beam from the centerline of the selected information track; and the means for detecting includes photodetector means for detecting the reflected beam and producing an information signal corresponding to the intensity thereof, and means, responsive to variations in the average magnitude of the information signal, for producing the intermediate signal.

10. Apparatus as defined in claim 9, wherein said detecting means further includes:

oscillator means for producing a periodic dither signal;

means, responsive to the dither signal, for causing the read beam to oscillate along an axis transverse to the axis of the selected information track, thereby causing a corresponding oscillation in the average intensity of the reflected read beam and in the average magnitude of the information signal; and means for comparing the oscillation in the average magnitude of the information signal to the periodic dither signal, to produce the intermediate signal, wherein the intermediate signal is indicative of both the magnitude and direction of any deviation of the read beam from the centerline of the selected information track.

11. Apparatus as defined in claim 10, wherein the means for causing the read beam to oscillate includes a bimorph mirror disposed in the path of the read beam.

12. Apparatus as defined in claim 8, wherein said means for controllably moving includes:

means, responsive to the filtered intermediate signal, for producing a control pulse signal containing a sequence of pulses whenever the intermediate signal exceeds a prescribed threshold; and stepper motor means, responsive to the control pulse signal, for moving said carriage means, said stepper motor means being coupled to said carriage means such that a prescribed plurality of pulses of the control pulse signal are required to translate the read beam from one information track to an adjacent information track.

* * * * *